No. 620,693. Patented Mar. 7, 1899.
D. E. CARLE & R. W. BLAZE.
APPARATUS FOR FINISHING GLASSWARE.
(Application filed Jan. 30, 1896.)
(No Model.)
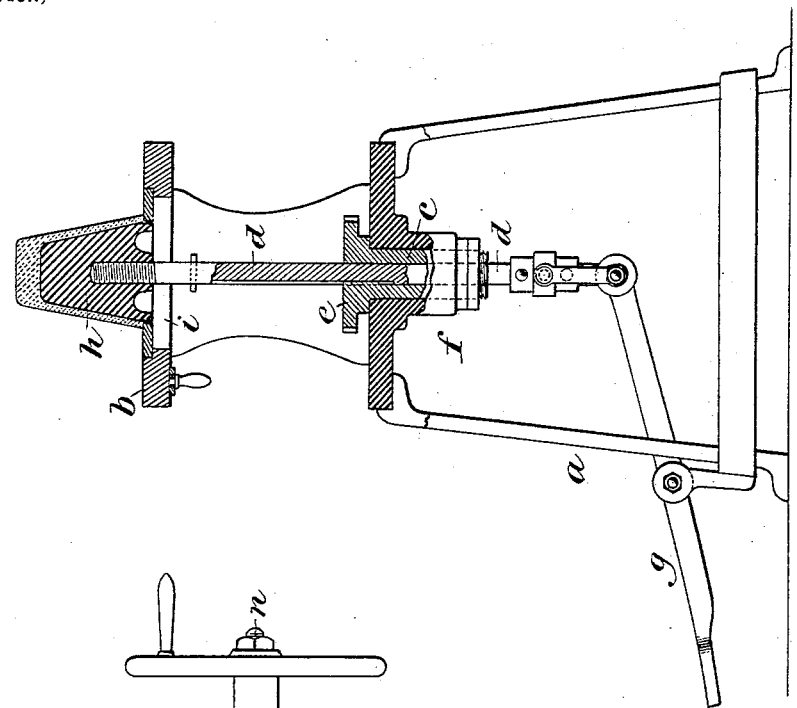
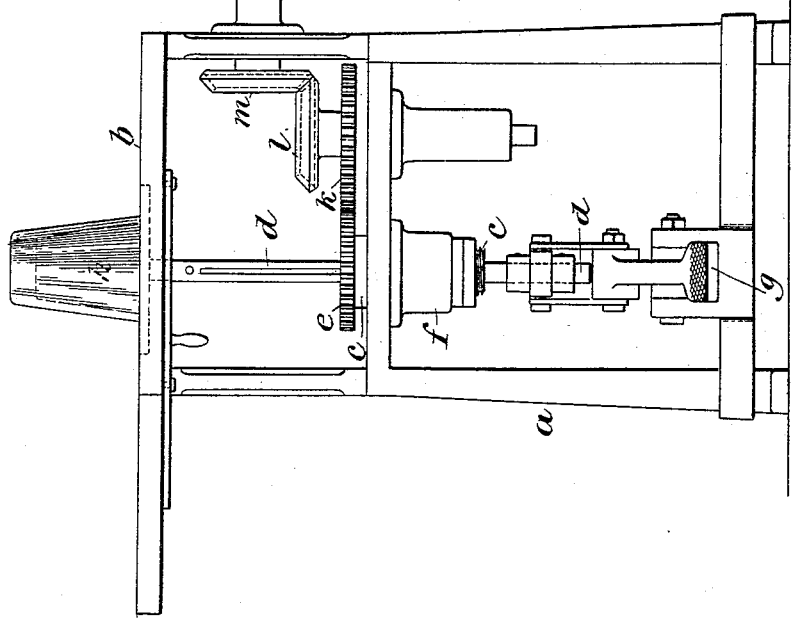
WITNESSES
S. E. Craft
F. E. Harpell
INVENTORS
David E. Carle
Robert W. Blaze
by James K. Bakewell
Their Attorney
THE NORRIS PETERS CO., PHOTO-LITHO., WASHINGTON, D. C.

UNITED STATES PATENT OFFICE.

DAVID E. CARLE AND ROBERT W. BLAZE, OF JEANNETTE, PENNSYLVANIA, ASSIGNORS TO McKEE & BROTHERS, OF PITTSBURG, PENNSYLVANIA.

APPARATUS FOR FINISHING GLASSWARE.

SPECIFICATION forming part of Letters Patent No. 620,693, dated March 7, 1899.

Application filed January 30, 1896. Serial No. 577,402. (No model.)

*To all whom it may concern:*

Be it known that we, DAVID E. CARLE and ROBERT W. BLAZE, of Jeannette, in the county of Westmoreland and State of Pennsylvania, have invented a new and useful Improvement in Apparatus for Finishing Glassware, of which the following is a full, clear, and exact description, reference being had to the accompanying drawings, forming part of this specification, in which—

Figure 1 is a front elevation of our improved apparatus for finishing articles of glassware, and Fig. 2 is a vertical sectional view.

Like letters of reference indicate like parts wherever they occur.

Our invention relates to an improvement in apparatus for finishing articles of glassware—such as tumblers, dishes, and like articles—where it is necessary or advisable that the mouth or face of the same should be made smooth, regular, and of a certain shape and size; and it consists in a vertical revoluble shaft having a finishing-head, a table, and devices for reciprocating and rotating the finishing-head, as is herein specified.

In the drawings, $a$ represents the frame of the table $b$, in which frame is a sleeve $c$, through which passes the vertical shaft $d$. Mounted on the shaft $d$ and connected therewith by a feather and spline is the gear-wheel $e$, which is secured to or made part of the revoluble sleeve $c$, which fits in the bearing $f$. Pivoted to the base of the shaft $d$ is the foot-treadle $g$, which is so pivoted to the frame $a$ that the vertical shaft $d$ may be reciprocated thereby. Detachably secured to the shaft $d$ is the forming-head $h$, which may be of substantially the shape of the interior of the tumbler to be finished, as shown in the drawings, of the shape of a dish, so as to conform to the outer surface of a glass dish to be finished, or of any suitable shape to finish the interior or exterior surface of glass articles, and it is adapted to be raised and lowered through the opening $i$ in the table $b$. The shaft $d$ is driven by the gear-wheels $e$ and $k$ and the bevel-wheels $l$ and $m$, which transmit power from the power-shaft $n$.

The operation is as follows: The tumblers or other glass articles to be finished are heated in the glory-hole furnace. The workman presses on the foot-treadle $g$, thereby causing the head $h$ to rise in the opening in the table, and the tumbler as brought from the glory-hole is placed over the head $h$. This head is then caused to revolve on its axis by the revolution of the shaft $d$, and the inner surface of the tumbler is finished thereby, the outer surface being pressed on and finished by a stick of wood in the hands of the workman. When the tumbler is finished, the head $h$ on the shaft $d$ is allowed to drop below the level of the table $b$, the finished article is moved to one side, and an unfinished tumbler put in its place on the head $h$. By having the opening $i$ smaller than the article as the former is lowered the article is freed from the former and is left standing on the table. By this construction we avoid the necessity of lifting the article from the former and the liability of marring the appearance of the article by the tool for lifting same from the former.

Although we have shown our improvement adapted to finish tumblers, we do not desire to limit its use thereto, as it may be employed in the finishing of many shapes of glassware by changing the shape of the head $h$.

The advantages of our invention will be apparent to those skilled in the art. By it articles of glassware may be made of a uniform shape and size and the finishing is done much more rapidly than it can be done by hand.

We are aware that the use of a rotatory former mounted on a horizontal shaft has been employed in forming and finishing the necks of bottles and in flaring lamp-chimneys, and we do not desire to claim the same.

What we claim is—

1. In apparatus for finishing articles of glassware, the combination of a suitable table having an opening therein, a vertical rotary shaft having a former in line with said opening substantially the size of the opening and shape of the interior of the article and adapted to enter the same, mechanism for rotating said shaft and mechanism for imparting a vertical movement to said shaft, whereby said former is raised and lowered through said opening, whereby to leave the article on the table when the former is lowered, substantially as set forth.

2. In apparatus for finishing articles of glassware, the combination with a suitable table having an opening therein, a vertical rotary shaft having a former in line with said opening substantially the shape of the interior of the article and adapted to enter the same, mechanism for rotating said shaft, and mechanism for elevating said former above the level of the table through said opening and for lowering it below the level thereof, whereby to leave the article on the table when the former is lowered, substantially as set forth.

3. In apparatus for finishing articles of glassware, the combination of a suitable table having an opening therein of smaller size than the article to be finished, a vertical rotary shaft having a former in line with said opening substantially the shape of the interior of the article and adapted to enter the same, mechanism for rotating said shaft, and mechanism for raising and lowering the former above and below the level of the table, whereby to leave the article on the table when the former is lowered, substantially as set forth.

In testimony whereof we have hereunto set our hands.

DAVID E. CARLE.
ROBERT W. BLAZE.

Witnesses:
F. E. HARPELL,
S. E. CRAFT.